(12) United States Patent  
Hirose (10) Patent No.: US 12,157,517 B2  
(45) Date of Patent: Dec. 3, 2024

(54) FLOOR TUNNEL (71) Applicant: NIPPON STEEL CORPORATION, Tokyo (JP)

(72) Inventor: Satoshi Hirose, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 447 days.

(21) Appl. No.: 17/289,568

(22) PCT Filed: Oct. 29, 2019

(86) PCT No.: PCT/JP2019/042313  
§ 371 (c)(1),  
(2) Date: Apr. 28, 2021

(87) PCT Pub. No.: WO2020/095756  
PCT Pub. Date: May 14, 2020

(65) Prior Publication Data  
US 2022/0009559 A1  Jan. 13, 2022

(30) Foreign Application Priority Data  
Nov. 6, 2018 (JP) .................................. 2018-208698

(51) Int. Cl.  
*B62D 25/20* (2006.01)  
*B62D 21/15* (2006.01)

(52) U.S. Cl.  
CPC .............. *B62D 25/20* (2013.01); *B62D 21/15* (2013.01)

(58) Field of Classification Search  
CPC ................................ B62D 25/20; B62D 21/15  
(Continued)

(56) References Cited

U.S. PATENT DOCUMENTS 9,896,131 B2 * 2/2018 Onishi ................... B62D 25/20  
2010/0156146 A1 * 6/2010 Matsuyama ....... B62D 25/2036  
296/193.07

(Continued)

FOREIGN PATENT DOCUMENTS

JP 2007-106264 A 4/2007  
JP 2010-23537 A 2/2010  
(Continued)

OTHER PUBLICATIONS https://www.setareh.arch.vt.edu/safas/007_fdmtl_14_tension_compression_and_bending_stresses_and_strains.html#:~:text=The%20compression%20force%20results%20in,stresses%20due%20to%20internal%20moments (Year: 2011).*

*Primary Examiner* — Amy R Weisberg  
*Assistant Examiner* — Dana D Ivey  
(74) *Attorney, Agent, or Firm* — Birch, Stewart, Kolasch & Birch, LLP (57) ABSTRACT

The present floor tunnel is laid on a floor surface of a vehicle interior along a vehicle front-rear direction, extends substantially linearly along the vehicle front-rear direction, has a front end and a rear end, and has an open cross-sectional shape of a hat shape in which a shape of a cross section perpendicular to the vehicle front-rear direction protrudes from the floor surface. The floor tunnel includes a front end region that has the front end and a main region that has the rear end and continues to the front end region. When a total length from the front end to the rear end is L (mm), a boundary position between the front end region and the main region is within a range between a position at 30 mm from the front end toward the rear end and a position at L/5 from the front end toward the rear end. Yield strength of the front end region is lower than yield strength of the main region.

21 Claims, 10 Drawing Sheets

(58) Field of Classification Search
USPC .......................................................... 296/204
See application file for complete search history.

(56) References Cited

U.S. PATENT DOCUMENTS

| | | | |
|---|---|---|---|
| 2017/0057549 A1* | 3/2017 | Saeki | ................. B62D 25/2036 |
| 2018/0065676 A1* | 3/2018 | Yoshida | ................. B62D 25/20 |
| 2018/0208250 A1 | 7/2018 | Sasakura | |
| 2020/0262490 A1 | 8/2020 | Viaux | |

FOREIGN PATENT DOCUMENTS

| | | |
|---|---|---|
| JP | 2010-188965 A | 9/2010 |
| JP | 2014-43133 A | 3/2014 |
| JP | 2018-118573 A | 8/2018 |
| JP | 2018-536583 A | 12/2018 |
| WO | WO 2016/148057 A1 | 9/2016 |

* cited by examiner

FLOOR TUNNEL

TECHNICAL FIELD

The present invention relates to a floor tunnel of an automobile. Priority is claimed on Japanese Patent Application No. 2018-208698, filed Nov. 6, 2018, the content of which is incorporated herein by reference.

BACKGROUND ART

Until recently, various types of collision modes have been studied to ensure the safety of automobiles. At that time, studies of a collision mode with the highest accident rate have been preferentially performed, and safety has been improved to the extent that a collision does not lead to a significant accident. A further matter for study is a countermeasure against a mode in which a head-on collision occurs with a roadside tree or a utility pole, and its importance has been increasing in recent years.

An external force that is applied to a vehicle at the time of a head-on collision is applied to a central position in a vehicle width direction toward a vehicle rear side. A floor tunnel is present on an extension line of the external force input destination for the vehicle. However, the floor tunnel is just a part for covering the exhaust pipe and drive shaft and is only a part of the floor.

Under such a background, various techniques have been attempted to improve the collision performance of a floor structure.

For example, Patent Document 1 discloses a vehicle body structure including a first bead extending in a vehicle length direction and a second bead extending in a circumferential direction of a tunnel portion.

Patent Document 2 discloses a vehicle body structure having a bent portion at a connecting portion between a floor tunnel and a protruding portion of a toe-board.

Patent Document 3 discloses a vehicle body structure in which a dash cross member is provided on a rear surface side of a dash panel that separates a front portion of a vehicle body and a vehicle interior from each other.

Patent Document 4 discloses a floor structure including a tunnel reinforcement that covers a corner between an upper wall portion and a standing wall portion of a floor tunnel.

Patent Document 5 discloses a vehicle lower structure in which the resistance to the plastic deformation of a central portion of a beam disposed in a transverse direction of a vehicle is larger than the resistance to the plastic deformation of an end portion of the beam.

CITATION LIST

Patent Document

Patent Document 1

Japanese Unexamined Patent Application, First Publication No. 2007-106264

Patent Document 2

Japanese Unexamined Patent Application, First Publication No. 2010-023537

Patent Document 3

Japanese Unexamined Patent Application, First Publication No. 2014-043133

Patent Document 4

Japanese Unexamined Patent Application, First Publication No. 2018-118573

Patent Document 5

Published Japanese Translation No. 2018-536583 of the PCT International Publication

SUMMARY OF THE INVENTION

Problems to be Solved by the Invention

On the other hand, since a vehicle interior is also a living space for users, originally, reduction of vibration and noise has also been required to improve comfort. In addition, since a floor tunnel is relatively large among components of a vehicle body, weight reduction thereof has also been required.

In this respect, in the technique of Patent Document 1, there is elongated unevenness such as the first bead and the second bead provided in the tunnel portion, and the unevenness may induce vibration.

Further, in the technique of Patent Document 2, a large curve is applied at the bent portion, but a vibration mode changes with the bent portion as a boundary, and thus this may induce vibration as well.

In Patent Document 3, as described in the problems thereof, a minute lap collision or an offset collision is a target, and a head-on collision is not a target.

Patent Document 4 can increase the stiffness using a reinforcing member that suppresses deformation of the floor tunnel. However, due to the addition of the reinforcing member, weight reduction cannot be expected.

Patent Document 5 originally relates to a beam in a transverse direction and does not relate to the plastic deformation of a floor tunnel. Since a lower portion of the beam is joined to a floor panel, the beam is used in a state in which a cross section perpendicular to a longitudinal direction thereof forms a closed cross section. Therefore, this beam is formed on the premise of receiving an external force in a closed cross-sectional shape, and thus the beam cannot be easily applied to a floor tunnel formed on the premise of an open cross-sectional shape.

As described above, it has been difficult for a floor tunnel in the related art to satisfy all three of collision performance, soundproofing performance, and weight reduction.

The present invention has been made in view of the above circumstances, and an object of the present invention is to satisfy all of collision performance, soundproofing performance, and weight reduction in a floor tunnel of an automobile.

Means for Solving the Problem

To solve the above problems, the present invention has employed the following aspects.
(1) An aspect of the present invention is a floor tunnel which is laid on a floor surface of a vehicle interior along a vehicle front-rear direction, extends substantially linearly along the vehicle front-rear direction, has a front end and a rear end, and has an open cross-sectional shape of a hat shape in which a shape of a cross section perpendicular to the vehicle front-rear direction protrudes from the floor surface, the floor tunnel including: a front end region that includes the front end; and a main region that has the rear end and continues to the front end region, wherein, when a total length from the front end to the rear end is L (mm), a boundary position between the front end region and the main region is within a range between a position at 30 mm from the front end toward the rear end and a position at L/5 from the front end toward the rear end, and wherein a yield strength of the front end region is lower than a yield strength of the main region.

According to the floor tunnel related to the aspect (1), in a case in which an impact force is applied to the front end region of the floor tunnel toward a vehicle rear side, the front end region which has a relatively low yield strength absorbs most of the impact force while bending. On the other hand, the rest of the impact force has already been significantly reduced by the plastic deformation of the front end region and is then transmitted to the main region. In addition, since the yield strength of the main region is relatively high, it is possible to receive the rest of the impact force without large plastic deformation. Therefore, high collision performance can be exhibited.

Moreover, unlike the structure in the related art, since a reinforcing member such as a bead is not added, soundproofing performance and weight reduction can be achieved. The total length L (mm) is 1000 mm or more.

Since the floor tunnel of the present invention has a hat shape, the structure in which the front end region has a closed cross-sectional shape is excluded. If the front end region has a closed cross-sectional shape, the front end region that has received the load due to the impact absorbs the impact by "crushing" in an axial direction by itself instead of "bending". At this time, a part of the impact force is released to the main region while the front end region is plastically deformed while crushing. That is, because of the closed cross-sectional shape, the strength of the structure is higher than that of the open cross-sectional shape, and it cannot be easily and immediately plastically deformed with respect to the impact. On the other hand, since the present aspect employs the front end region of an open cross-sectional shape, the impact force is absorbed by "bending" instead of "crushing". Since the front end region that has received the impact force has an open cross-sectional shape, it bends immediately while being deformed such that the hat shape opens. During this time, most of the impact force is exhausted on bending in the front end region, and the force that reaches the main region is small. Since the floor tunnel has an open cross-sectional shape for its function, in the open cross-sectional shape, resistance to axial loads is lower than that of the closed cross-section structure. Therefore, if the impact force is not sufficiently and immediately absorbed in the front end region, the force that is transmitted to the main region as the rest of the impact force becomes large, and the main region is also plastically deformed. Therefore, when the structure of the closed cross-sectional shape disclosed in the above-mentioned Patent Document 5 is simply applied to the floor tunnel, sufficient impact force absorption is not performed due to the above-mentioned problem, and there is a high possibility of causing the floor structure to be deformed.

(2) The floor tunnel according to (1) may further include, when a shape of the floor tunnel along the vehicle front-rear direction is seen in a vertical cross section: a curved shape portion that includes the front end and is curved upward from the rear end toward the front end; and a linear shape portion that continues to the curved shape portion, extends substantially linearly along the vehicle front-rear direction, and includes the rear end, wherein the front end region is in the curved shape portion.

According to the floor tunnel of (2), since the front end region is located in the curved shape portion that is curved upward, a portion forming an upper wall of the hat shape in the front end region is inclined in advance in a bending direction. Therefore, when the impact force is applied, the front end region is bent more reliably, and thus higher collision performance can be ensured.

(3) In the floor tunnel according to (1) or (2), the following configuration may be employed: both the front end region and the main region are made of steel, and a Young's modulus of the front end region and a Young's modulus of the main region are the same.

According to the floor tunnel of (3), in the front end region and the main region, Young's moduli are the same although the yield stresses are different from each other. Since vibration noise is likely to occur in portions having different Young's moduli, according to the above aspect, it is possible to effectively suppress noise vibration.

(4) In the floor tunnel according to any one of (1) to (3), the yield strength of the front end region may be lower than the yield strength of the main region by 10% or more and 80% or less.

According to the floor tunnel of (4), it is possible to more reliably obtain plastic deformation in the front end region.

(5) In the floor tunnel according to any one of (1) to (4), a plate thickness of the front end region may be thinner than a plate thickness of the main region.

According to the floor tunnel of (5), it is possible to provide a difference in yield strength by making the plate thickness in the front end region relatively thin with respect to the main region. In addition, by reducing the plate thickness, it is possible to further reduce weight.

(6) In the floor tunnel according to any one of (1) to (5), the yield strength of the main region may be 780 MPa or more and 1800 MPa or less.

According to the floor tunnel of (6), it is possible to more reliably suppress the opening of the hat shape and absorb the impact force.

Effects of the Invention

It is possible to satisfy all of collision performance, soundproofing performance, and weight reduction in a floor tunnel of an automobile.

EMBODIMENT(S) FOR IMPLEMENTING THE INVENTION

Hereinafter, an embodiment of the present invention will be described with reference to the drawings. In the specification of the present application and the drawings of the present application, elements having substantially the same functional configuration are designated by the same reference symbols, and duplicate descriptions thereof will be omitted.

Figure 1:
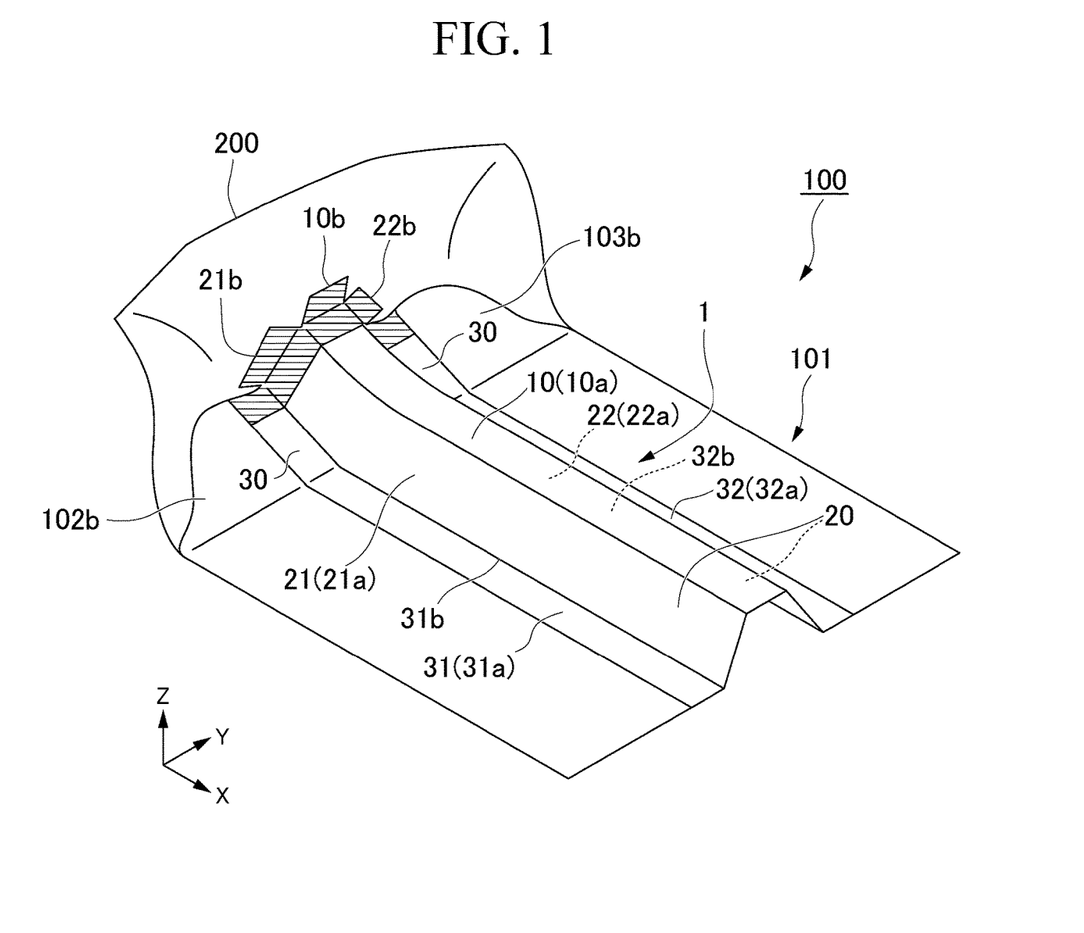
FIG. 1 is a perspective view showing a floor structure including a floor tunnel according to an embodiment of the present invention.
Figure 2:
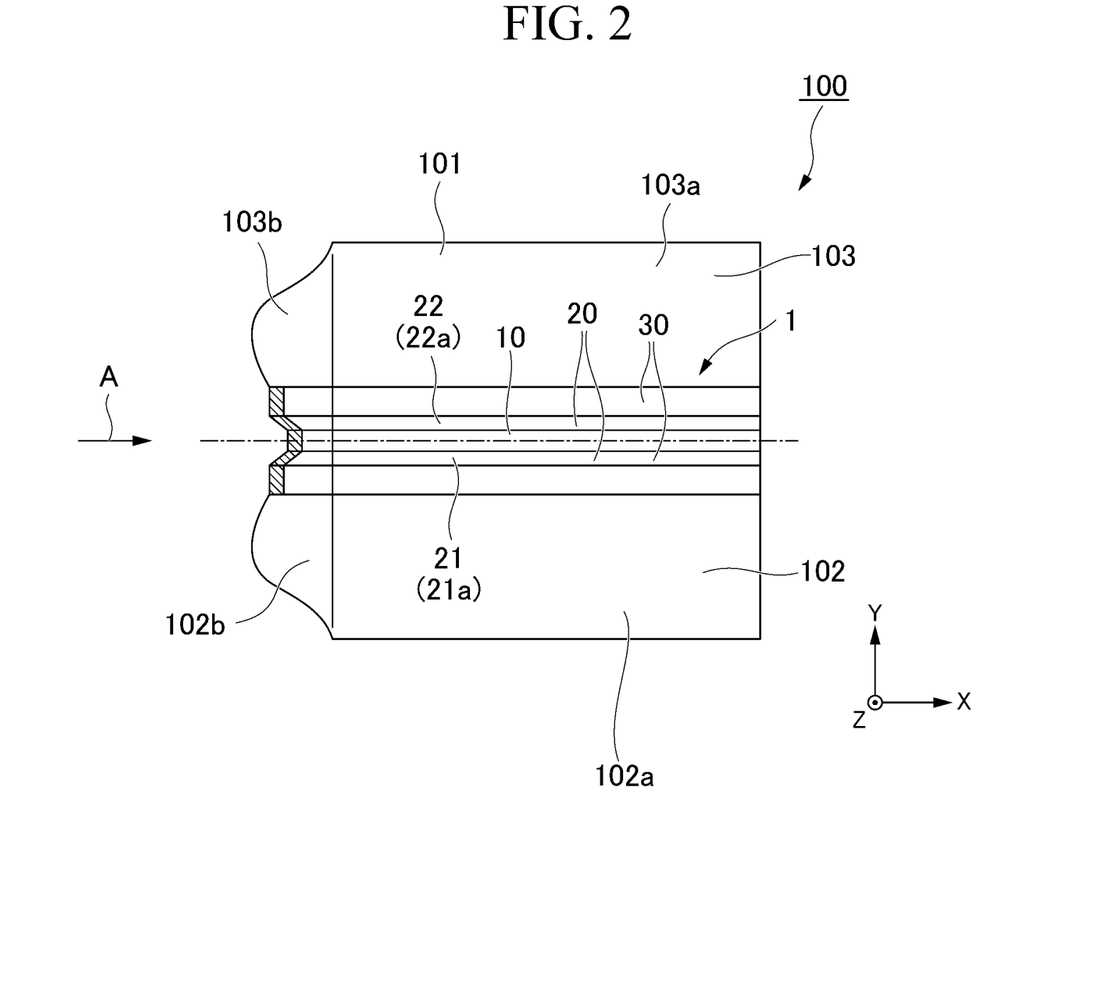
FIG. 2 is a plan view of the floor structure.
Figure 3:
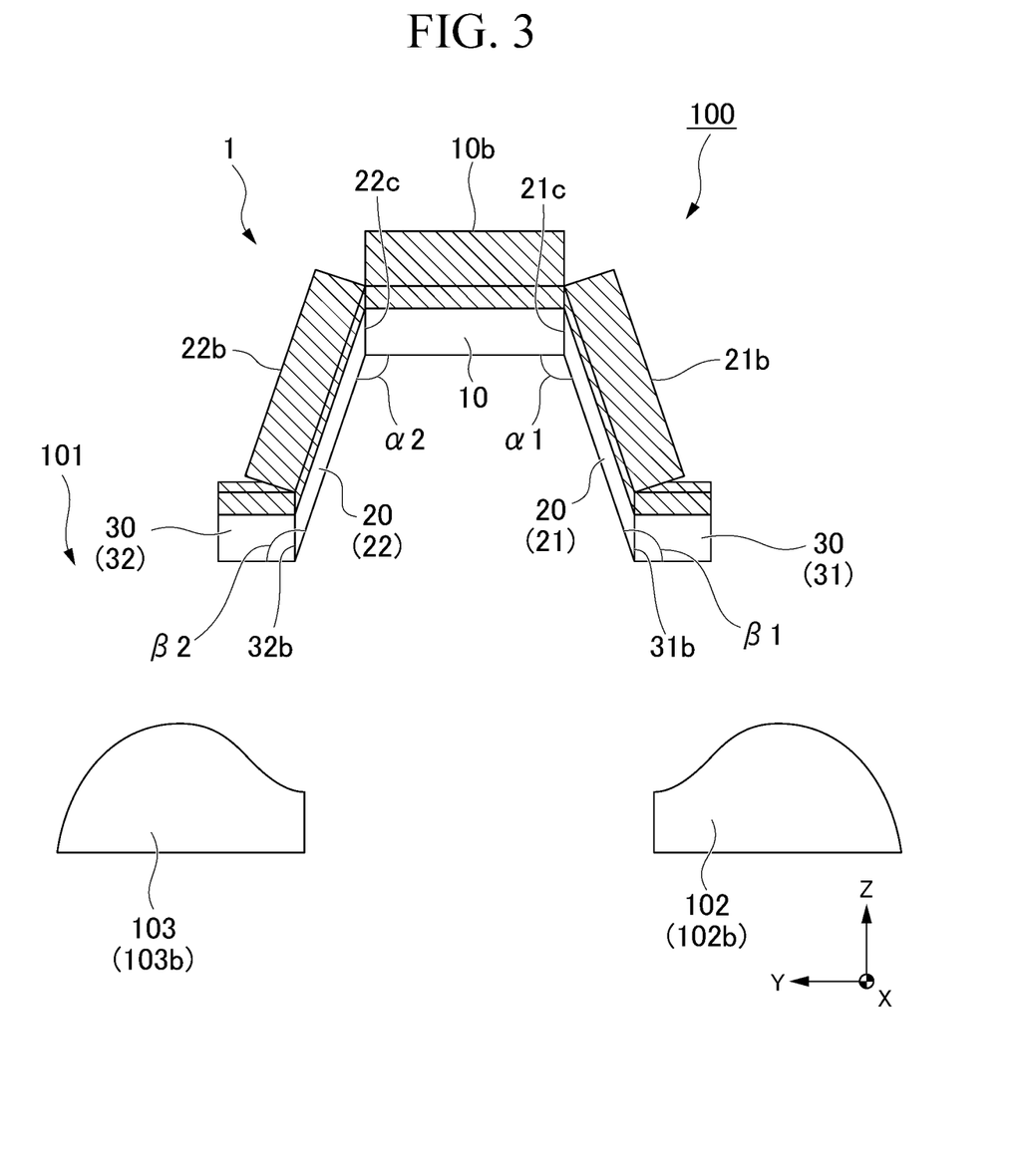
FIG. 3 is an exploded view of the floor structure, which is a view seen from arrow A in FIG. 2.
Figure 4:
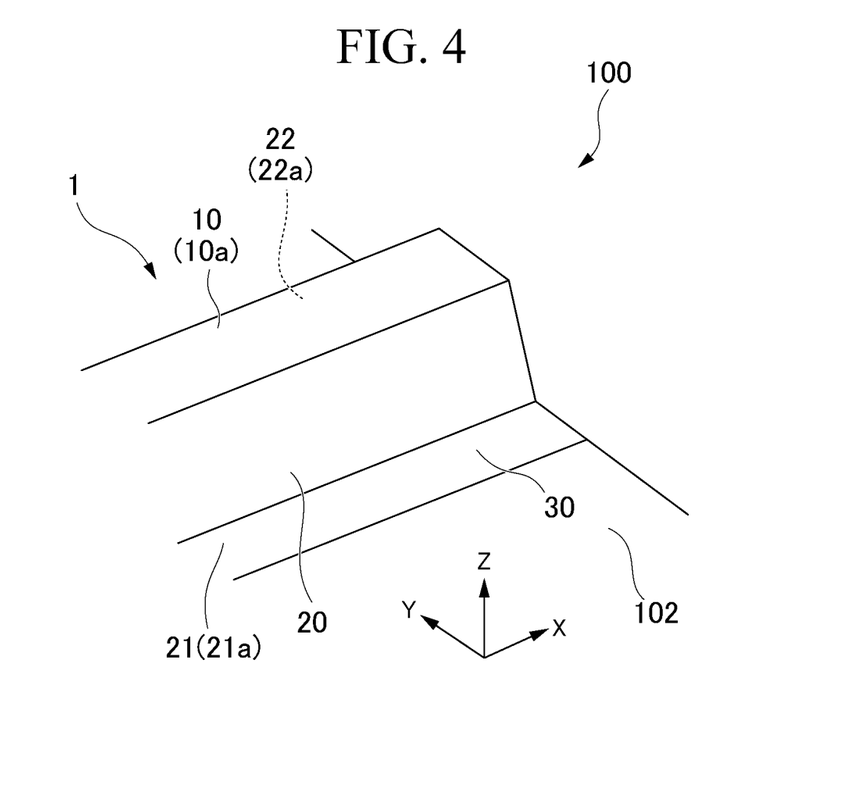
FIG. 4 is a perspective view showing a rear portion of the floor structure.

FIG. 1 shows a floor structure 100 of the present embodiment. FIG. 2 is a plan view of the floor structure 100. FIG. 3 is an exploded view of the floor structure 100, which is a view seen from arrow A in FIG. 2. FIG. 4 is a perspective view showing a rear portion of the floor structure 100.

In each figure, an X direction indicates a vehicle rear side in a vehicle front-rear direction (a vehicle length direction), a Y direction indicates a right direction in a vehicle left-right direction, and a Z direction indicates an upward direction in a vehicle height direction. The X, Y, and Z directions are perpendicular to each other. The same applies to other figures which will be described below.

As shown in FIGS. 1 to 4, the floor structure 100 of the present embodiment has a floor tunnel 1 and a floor panel 101. The floor structure 100 is welded and fixed to a vehicle body front wall 200 disposed in front of the floor structure 100. The vehicle body front wall 200 is a wall body that separates an engine room (not shown) and a vehicle interior (not shown) from each other. In addition, in FIG. 2 and FIG. 3, the vehicle body front wall 200 is omitted for the sake of explanation.

As shown in FIG. 3, the floor tunnel 1 of the present embodiment has a hat shape when seen from a front side of a vehicle. This hat shape is the same at each position from a front end 1A to a rear end 1B in the vehicle front-rear direction. That is, the floor tunnel 1 has an open cross-sectional shape in which a cross-sectional shape perpendicular to the vehicle front-rear direction forms a hat shape at each position and a lower part thereof is open.

As shown in FIGS. 1 to 4, the floor tunnel 1 has a top wall portion 10, a pair of standing wall portions 20 connected to the top wall portion 10, and flange portions 30 connected to each vertical wall portion 20.

As shown in FIG. 1, the top wall portion 10 has an upper surface 10a forming a top portion of a hat shape and is a wall body of a strip shape that is long in the vehicle front-rear direction. A front side of the top wall portion 10 in the vehicle front-rear direction is gently curved upward. The plate thickness of the top wall portion 10 is the same at each position in the vehicle front-rear direction, and the plate thickness can be exemplified as 0.8 mm to 2.0 mm.

As shown in FIGS. 1 and 3, the top wall portion 10 has an upper flange 10b provided at a front end thereof. The upper flange 10b is bent with respect to the upper surface 10a and faces upward. The upper flange 10b is welded and fixed to the vehicle body front wall 200. In FIG. 2, the upper flange 10b is omitted for the sake of explanation.

As shown in FIGS. 1 and 2, the pair of standing wall portions 20 have a left standing wall 21 and a right standing wall 22.

The left standing wall 21 has a left side surface 21a and is a wall body of a strip shape that is long in the vehicle front-rear direction. The front side of the left standing wall 21 in the vehicle front-rear direction is gently curved upward as shown in FIG. 1. The plate thickness of the left standing wall 21 is the same as that of the top wall portion 10 and is the same at each position in the vehicle front-rear direction.

As shown in FIGS. 1 and 3, the left standing wall 21 has a left wall flange 21b provided at a front end thereof. The left wall flange 21b is bent with respect to the left side surface 21a and faces diagonally upward to the left. In FIG. 2, the left wall flange 21b is omitted for the sake of explanation. The left wall flange 21b is welded and fixed to the vehicle body front wall 200.

As shown in FIG. 3, the left standing wall 21 is integrally connected to a side of the top wall portion 10 via a ridge line 21c. When seen in a cross section perpendicular to each position in the vehicle front-rear direction, the left standing wall 21 is connected to the top wall portion 10 at an obtuse angle. As an example of an angle α1 formed by a lower surface of the top wall portion 10 and an inner surface of the left standing wall 21 in the cross section, 90 degrees to 120 degrees can be shown.

As shown in FIG. 2, the right standing wall 22 has a right side surface 22a and is a wall body of a strip shape that is long in the vehicle front-rear direction. The front side of the right standing wall 22 in the vehicle front-rear direction is gently curved upward as in the left standing wall 21. The plate thickness of the right standing wall 22 is the same as that of the top wall portion 10 and is the same at each position in the vehicle front-rear direction.

As shown in FIGS. 1 and 3, the right standing wall 22 has a right wall flange 22b provided at a front end thereof. The right wall flange 22b is bent with respect to the right side surface 22a and faces diagonally upward to the right. In FIG. 2, the right wall flange 22b is omitted for the sake of explanation. The right wall flange 22b is welded and fixed to the vehicle body front wall 200.

As shown in FIG. 3, the right standing wall 22 is integrally connected to another side of the top wall portion 10 via a ridge line 22c. When seen in a cross section perpendicular to each position in the vehicle front-rear direction, the right standing wall 22 is connected to the top wall portion 10 at an obtuse angle. In the present embodiment, a case in which an angle α2 formed by a lower surface of the top wall portion 10 and an inner surface of the right standing wall 22 in the cross section is the same as the angle α1 is exemplified. However, the present invention is not limited to only this configuration, and as long as the angle α2 is within the range of 90 degrees to 120 degrees, it may be different from the angle α1.

As shown in FIGS. 1 and 3, the pair of flange portions 30 have a left flange 31 and a right flange 32.

The left flange 31 has an upper surface 31a and is a wall body of a strip shape that is long in the vehicle front-rear direction. The front side of the left flange 31 in the vehicle front-rear direction is gently curved upward as shown in FIG. 1. The plate thickness of the left flange 31 is the same as that of the top wall portion 10 and is the same at each position in the vehicle front-rear direction.

As shown in FIG. 3, the left flange 31 is integrally connected to a lower end edge of the left standing wall 21 via a ridge line 31b. When seen in a cross section perpendicular to each position in the vehicle front-rear direction, the left flange 31 is connected to the left standing wall 21 at an obtuse angle. As an example of the angle β1 formed by the left side surface 21a of the left standing wall 21 and the upper surface 31a of the left flange 31 in the cross section, 90 degrees to 120 degrees can be shown.

The right flange 32 has an upper surface 32a and is a wall body of a strip shape that is long in the vehicle front-rear direction. The front side of the right flange 32 in the vehicle front-rear direction is gently curved upward as shown in FIG. 1. The plate thickness of the right flange 32 is the same as that of the top wall portion 10 and is the same at each position in the vehicle front-rear direction.

As shown in FIG. 3, the right flange 32 is integrally connected to a lower end edge of the right standing wall 22 via a ridge line 32b. When seen in a cross section perpendicular to each position in the vehicle front-rear direction, the right flange 32 is connected to the right standing wall 22 at an obtuse angle. In the present embodiment, a case in which an angle β2 formed by the right side surface 22a of the right standing wall 22 and the upper surface 32a of the right flange 32 in the cross section is the same as the angle β1 is exemplified. However, the present invention is not limited to only this configuration, and as long as the angle β2 is within the range of 90 degrees to 120 degrees, it may be different from the angle β1.

The left flange 31 and the right flange 32 are parallel to each other and are both welded and fixed to an upper surface of the floor panel 101. In the present invention, the left flange 31 and the right flange 32 are not provided with notches to reduce vibration and noise. The floor tunnel 1 of the present embodiment is formed separately from the floor panel 101, but the present invention is not limited to only this configuration. The floor tunnel 1 and the floor panel 101 may be integrally formed by a single plate material being pressed. Further, the left flange 31 and the right flange 32 do not have to be parallel to each other.

The floor panel 101 is a component on which passenger seats (not shown) are to be disposed.

As shown in FIGS. 2 and 3, the floor panel 101 has a left panel 102 disposed on a left side in a vehicle width direction and a right panel 103 disposed on a right side in the vehicle width direction.

The left panel 102 has a rectangular main panel portion 102a and a front panel portion 102b that integrally continues to a front edge of the main panel portion 102a. The front panel portion 102b is gently curved upward from the front edge of the main panel portion 102a.

The right panel 103 has a rectangular main panel portion 103a and a front panel portion 103b that integrally continues to a front edge of the main panel portion 103a. The front panel portion 103b is gently curved upward from the front edge of the main panel portion 103a.

As shown in FIG. 1, the front panel portions 102b and 103b are welded and fixed to the vehicle body front wall 200, respectively.

Figure 5:
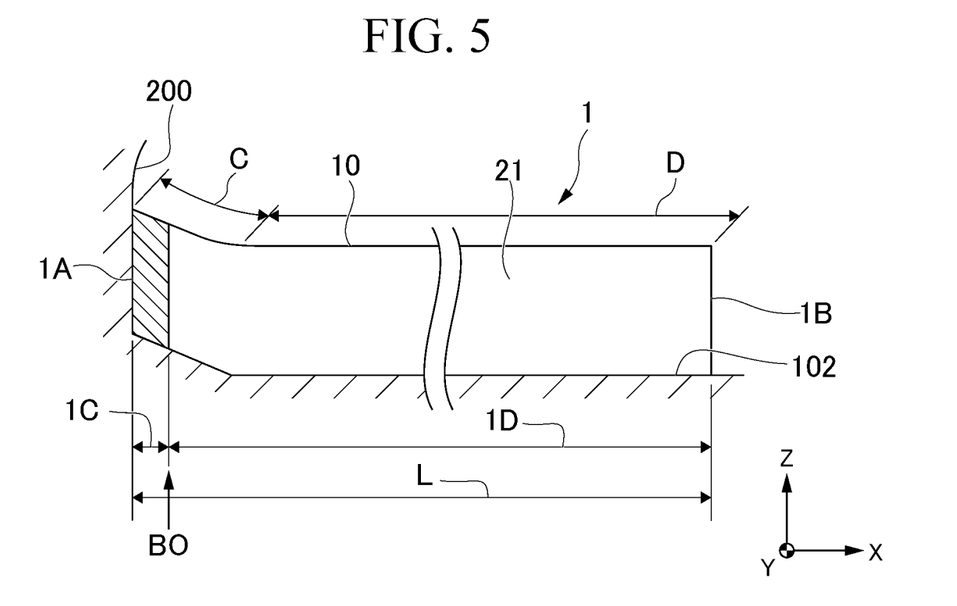
FIG. 5 is a side view for explaining a front end region of the floor tunnel.

FIG. 5 is a side view for explaining a front end region 1C of the floor tunnel 1.

As shown in FIG. 5, in the floor tunnel 1 of the present embodiment, when the total length up to the rear end 1B starting from the front end 1A in the vehicle front-rear direction is L (mm), the range of 0.1×L or less from the front end 1A is a front end region 1C, and the range exceeding 0.1×L to the rear end 1B is the main region 1D, yield strength of the front end region 1C is lower than yield strength of the main region 1D. That is, the yield strength of the front end region 1C is lower than the yield strength of the main region 1D which is a region other than the front end region 1C with a boundary position BO shown in FIG. 5 as a boundary. The front end region 1C refers to a region of ¹⁄₁₀ or less of the member length L in the vehicle front-rear direction starting from the front end 1A of the floor tunnel 1 in the vehicle front-rear direction. In the present embodiment, the boundary position BO between the front end region 1C and the main region 1D is a position of 0.1×L (=L/10) from the front end 1A toward the rear end 1B, but this is an example, and, as will be described later, the boundary position BO may be adjusted within a range of 30 mm or more and L/5 or less (L≥1000 mm) from the front end 1A toward the rear end 1B.

When seen in the vehicle front-rear direction, the sum of the total length of the front end region 1C and the total length of the main region 1D becomes the total length L. Here, as shown in FIG. 5, in the floor tunnel 1 of the present embodiment, the front side thereof is curved upward, but the total length L in this case is a straight line distance between the front end 1A and the rear end 1B.

In FIGS. 1 to 3 and 5, the front end region 1C is a portion indicated by hatching. Specifically, as shown in FIG. 3, the front end region 1C includes a front end portion of the top wall portion 10 including the upper flange 10b, a front end portion of the pair of standing wall portions 20 including the left wall flange 21b, a front end portion of the pair of standing wall portions 20 including the right wall flange 22b, and front end portions of a pair of flange portions 30. Therefore, the main region 1D includes a portion of the top wall portion 10 other than the front end portion, portions of the pair of standing wall portions 20 other than the front end portions, and portions of the pair of flange portions 30 other than the front end portions.

Yield strength difference between the front end region 1C and the main region 1D can be imparted to the floor tunnel 1 by a method which will be illustrated below.

For example, at the stage of preparing a plate material before manufacturing by pressing the floor tunnel 1, a plate material having a relatively low yield strength is laser-welded to a plate material having a relatively high yield strength to obtain a tailored blank. Then, pressing is performed such that in the tailored blank, the portion in which the yield strength is relatively low becomes the front end region 1C, and the portion in which the yield strength is relatively high becomes the main region 1D. As a result, the floor tunnel 1 including the front end region 1C and the main region 1D is manufactured.

In the tailored blank, steel can be selected as the material for both the plate material having a relatively low yield strength and the plate material having a relatively high yield strength. Further, as a material other than steel, other metals such as aluminum may be employed.

As another example, it is also possible that, after the floor tunnel 1 is pressed and manufactured, only the portion to be the front end region 1C is locally heat-treated to be softened, and the yield strength of the portion is reduced, thereby a difference in yield strength is formed. Alternatively, at the stage of preparing the plate material before manufacturing by pressing the floor tunnel 1, a local heat treatment may be performed on the portion to be the front end region 1C to reduce the yield strength, and then pressing may be performed.

As yet another example, at the stage of preparing a plate material before manufacturing by pressing the floor tunnel 1, a plate material having a relatively thin plate thickness is laser-welded to a plate material having a relatively thick plate thickness to obtain a blank. Then, pressing is performed such that in the blank, the portion having a relatively thin plate thickness becomes the front end region 1C, and the portion having a relatively thick plate thickness becomes the main region 1D. As a result, the floor tunnel 1 including the front end region 1C and the main region 1D is manufactured. Alternatively, after the floor tunnel 1 is manufactured by pressing, the yield strength difference may be provided by the reduction of the plate thickness of the front end region 1C to be thinner than that of the main region 1D.

The yield strength difference may be provided by the combination of the above examples or may be provided by another manufacturing method. In the following description, a floor tunnel 1 manufactured using a tailored blank (a composite material) made of plate materials having different yield strengths will be described as an example.

In the floor tunnel 1 made of a composite material having different yield strengths as described above, when an input is received from the front end in the vehicle front-rear direction at the time of a frontal collision of an automobile, the yield strength of the front end region 1C is lower than the yield strength of the main region 1D that continues to the rear of the front end region 1C, and thus, the front end region 1C becomes a starting point of bending. That is, in the floor tunnel 1 of the present embodiment, it is possible to induce bending in the front end region 1C, and it is possible to make it difficult to cause bending in the main region 1D behind the front end region 1C. Therefore, at the time of a collision, a large bending deformation is less likely to occur in the main region 1D, the amount of deformation of the floor structure 100 can be reduced, and the collision performance is improved.

To explain this point in more detail, in a case in which an impact force is applied to the front edge of the front end region 1C toward a vehicle rear side, the front end region 1C which has a relatively low yield strength absorbs most of the impact force while bending by itself. On the other hand, the rest of the impact force has already been significantly reduced by the plastic deformation of the front end region 1C and is then transmitted to the main region 1D. In addition, since the yield strength of the main region 1D is relatively high, it is possible to receive the rest of the impact force without large plastic deformation. Therefore, high collision performance can be exhibited.

As described above, since the floor tunnel 1 has a hat shape, the structure in which the front end region 1C has a closed cross-sectional shape is excluded. If the front end region 1C has a closed cross-sectional shape, the front end region 1C that has received the load due to the impact absorbs the impact by "crushing" in an axial direction by itself instead of "bending". At this time, a part of the impact force is released to the main region 1D while the front end region 1C is plastically deformed while crushing. That is, because of the closed cross-sectional shape, the strength of the structure is higher than that of the open cross-sectional shape, and it cannot be easily and immediately plastically deformed with respect to the impact. On the other hand, since the front end region 1C of the present embodiment employs an open cross-sectional shape, the impact force is absorbed by "bending" instead of "crushing". Since the front end region 1C that has received the impact force has an open cross-sectional shape, it bends immediately while being deformed such that the hat shape opens. During this time, most of the impact force is exhausted on bending in the front end region 1C, and the force that reaches the main region 1D is small. Therefore, it is possible to secure the soundness of the main region 1D and continue to maintain its function as a strength member, and thus high collision performance can be exhibited. Further, in the present invention, it is important to absorb the impact force in the front end region 1C, to ensure the soundness of the main region 1D, and to maintain the function as a strength member of the floor tunnel. Therefore, the collision performance of the floor tunnel as a whole is not improved by providing notches in the left flange 31 and the right flange 32 or simply providing a starting point for inducing the bending in overlay welding or the like. This is because a structure that is as straight and continuous as possible transmits the load more. On the other hand, if the load becomes too large, the rear end side is more likely to bend, and there is a concern that the collision performance may deteriorate. Therefore, to avoid a shape such as a bead that can be a bending-induction starting point and to cause bending in the front end region, it is necessary that the yield strength is different between the main region 1D and the front end region 1C.

Further, the floor tunnel 1 of the present embodiment does not have a structure provided with a bead-like shape that can be a starting point of vibration in improving the collision performance, and thus soundproofing performance can also be ensured. In addition, since both the front end region 1C and the main region 1D are made of steel, Young's modulus of the front end region 1C and Young's modulus of the main region 1D are the same. Vibration noise is likely to occur in parts having different Young's moduli. Therefore, if Young's moduli are the same as in the present embodiment, noise vibration can be effectively suppressed.

Further, the floor tunnel 1 of the present embodiment does not have a structure in which a reinforcing member is newly provided in improving the collision performance, and thus an increase in weight can be avoided.

Therefore, according to the floor tunnel 1 of the present embodiment, it is possible to satisfy all of the collision performance, the soundproofing performance, and the weight reduction.

The difference between the yield strength of the main region 1D and the yield strength of the front end region 1C is appropriately changed according to the shape of the floor structure 100 and the like. When the yield strength of the main region 1D is P1 (MPa) and the yield strength of the front end region 1C is P2 (MPa), the yield strength difference between these P1 and P2 only has to be 1%. However, in consideration of actual manufacturing error and the like, yield strength difference of 10% or more and 80% or less is desirable to surely obtain bending in the front end region 1C. When the yield strength difference referred to here is, for example, 10%, it is defined that a value obtained by subtracting $0.1 \times P1$ which is 10% of the yield strength P1 (MPa) of the main region 1D from the original P1 is equal to P2 ($P2 = P1 - 0.1 \times P1$).

The yield strength P1 of the main region 1D is preferably 780 MPa or more and 1800 MPa or less. As an example, a combination in which the yield strength P1 of the main region 1D is 780 MPa or more and the yield strength P2 of the front end region 1C is 590 MPa can be employed. Further, as another example, a combination in which the yield strength P2 of the front end region 1C is 1180 MPa and the yield strength P1 of the main region 1D is 1470 MPa can be employed.

In the above embodiment, the front end region 1C is a region of at least 1/10 or less of the member length L in the vehicle front-rear direction starting from the front end 1A of the floor tunnel 1 in the vehicle front-rear direction. The front end region 1C is more preferably a region of 30 mm or more from the front end 1A toward the rear end 1B. That is, regarding the front end region 1C, it is more preferable to secure a region within 30 mm from the front end 1A toward the rear end 1B with the front end 1A of the floor tunnel 1 in the vehicle length direction as a starting point, as a minimum front end region 1C. In this case, since the range of the main region 1D can be increased after inducing the bending in the front end region 1C, the main region 1D that withstands after the bending in the front end region 1C can be increased, and the collision performance can be improved.

Further, regarding the front end region 1C, it is more preferable to secure a region within 1/5 of the member length L in the vehicle front-rear direction from the front end 1A of the floor tunnel 1 in the vehicle length direction toward the rear end 1B, as a maximum front end region 1C. Accordingly, the bending occurs on the front end side, and the occurrence of the bending on the rear end side can be suppressed. As a result, the rest of the impact force can be received in the main region 1D without large plastic deformation, and thus the collision performance can be improved.

When the floor tunnel 1 is seen as a shape in the vehicle front-rear direction in a side view or a vertical cross-sectional view, the floor tunnel 1 has a curved shape portion C and a linear shape portion D as shown in FIG. 5. The curved shape portion C includes the front end 1A and has a curved shape that is curved upward from the rear end 1B side toward the tip end 1A side in a side view. On the other hand, the linear shape portion D integrally continues to the curved shape portion C, extends in the vehicle front-rear direction, and has a linear shape including the rear end 1B.

From the viewpoint of more effectively inducing bending in the front end region 1C, it is preferable that the front end region 1C is located at a portion having a curvature. That is, as shown in FIG. 5, it is preferable that the front end region 1C is located in the curved shape portion C.

In this case, since the front end region 1C and the boundary position BO are located in the curved shape portion C that is curved upward, a portion forming an upper wall of the hat shape in the front end region 1C is inclined in advance in a bending direction (upward). Therefore, when the impact force is applied, the front end region 1C is bent more reliably, and thus higher collision performance can be ensured.

As described above, the floor tunnel 1 of the present embodiment is laid on a floor surface of a vehicle interior along a vehicle front-rear direction, extends substantially linearly along the vehicle front-rear direction, has a front end 1A and a rear end 1B, and has an open cross-sectional shape in which a cross section perpendicular to the vehicle front-rear direction is a hat shape protruding from the floor surface. Further, the floor tunnel 1 of the present embodiment includes a front end region 1C that has a front end 1A, and a main region 1D that has a rear end 1B and continues to the front end region 1C. In addition, the floor tunnel 1 of the present embodiment employs a configuration that, when the total length from the front end 1A to the rear end 1B is L, the boundary position BO between the front end region 1C and the main region 1D is within a range between a position of 30 mm from the front end 1A toward the rear end 1B and a position of L/5 from the front end 1A toward the rear end 1B, and the yield strength of the front end region 1C is lower than the yield strength of the main region 1D.

According to the floor tunnel 1, it is possible to satisfy all of collision performance, soundproofing performance, and weight reduction.

EXAMPLE 1

Figure 6:
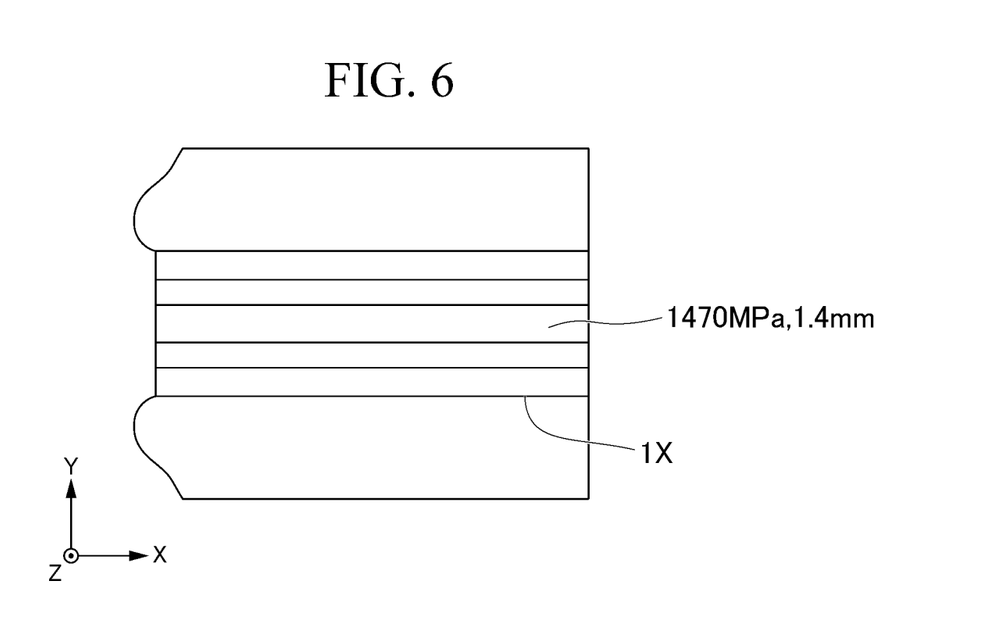
FIG. 6 is a plan view showing a floor tunnel according to Comparative Example 1 of Example 1.
Figure 7:
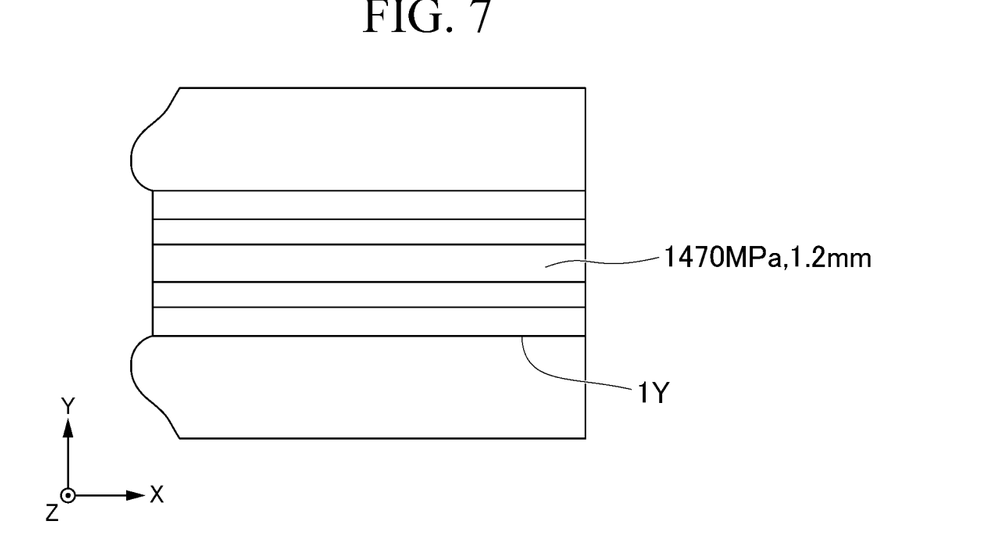
FIG. 7 is a plan view showing a floor tunnel according to Comparative Example 2 of Example 1.
Figure 8:
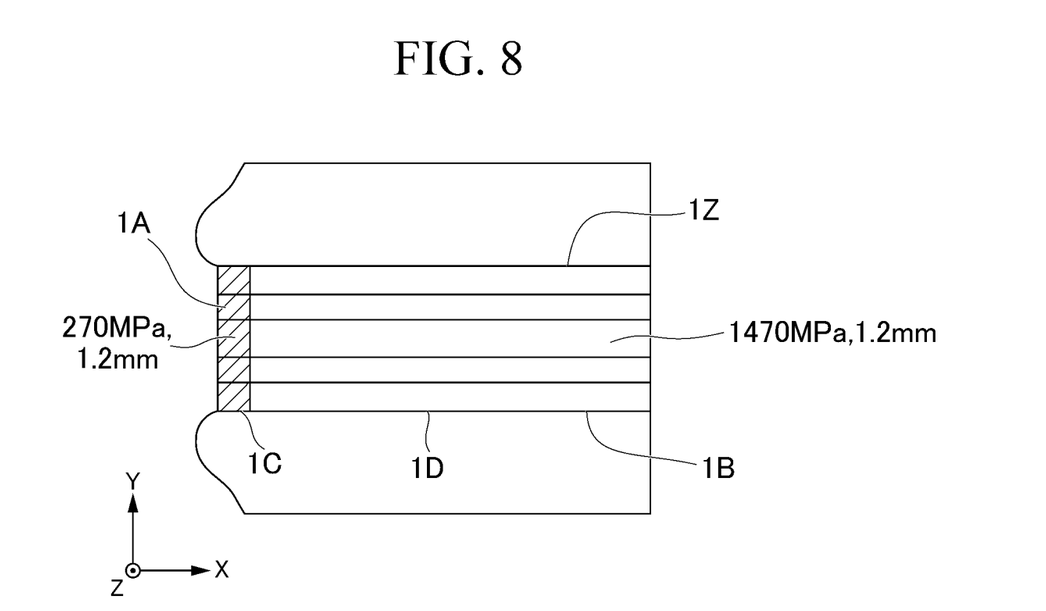
FIG. 8 is a plan view showing a floor tunnel according to Invention Example 1 of Example 1.

Analysis models of the vehicle were created, and a collision simulation to simulate a pole front collision test was executed. The analysis models include three models of a model (Comparative Example 1) having a floor tunnel 1X in which a plate thickness is 1.4 mm and yield strength of the entire member is 1470 MPa as shown in FIG. 6, a model (Comparative Example 2) having a floor tunnel 1Y in which a plate thickness is 1.2 mm and yield strength of the entire member is 1470 MPa as shown in FIG. 7, and a model (Invention Example 1) having a floor tunnel 1Z in which a plate thickness is 1.2 mm and yield strength is 270 MPa in the front end region 1C, and a plate thickness is 1.2 mm and yield strength is 1470 MPa in a region (the main region 1D) other than the front end region as shown in FIG. 8. The external dimensions of the floor tunnel 1Z of Invention Example 1, the floor tunnel 1X of Comparative Example 1, and the floor tunnel 1Y of Comparative Example 2 were all the same. Specifically, the total length is 1600 mm, the height is 300 mm, and the width is 480 mm.

In the floor tunnel 1Z of Invention Example 1, the region where the yield strength is 270 MPa (the front end region 1C) is a region up to 30 mm starting from the front end 1A of the floor tunnel 1Z.

In this simulation, the collision speed of the vehicle with respect to the pole is 64 km/h Then, a difference between the distance between two points of the front end and the rear end of each of the floor tunnels 1X, 1Y, and 1Z in an initial state before the collision and the distance between two points of the front end and the rear end of each of the deformed floor tunnels 1X, 1Y, and 1Z after the collision is an "intrusion amount". Then, the collision performance of each analysis model was evaluated based on this intrusion amount.

Figure 9:
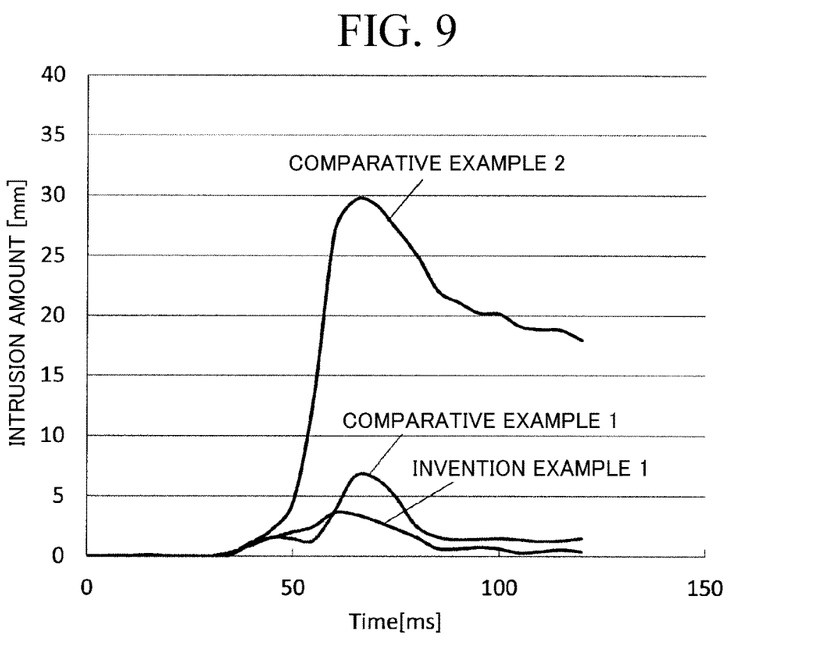
FIG. 9 is a graph showing the results of a collision simulation in Example 1 and showing the time history of an intrusion amount.

FIG. 9 is a graph showing the history of the intrusion amount in the collision simulation. As shown in FIG. 9, the intrusion amount of Invention Example 1 is smaller than the intrusion amount of each of Comparative Example 1 and Comparative Example 2, and the collision performance is improved.

Figure 10:
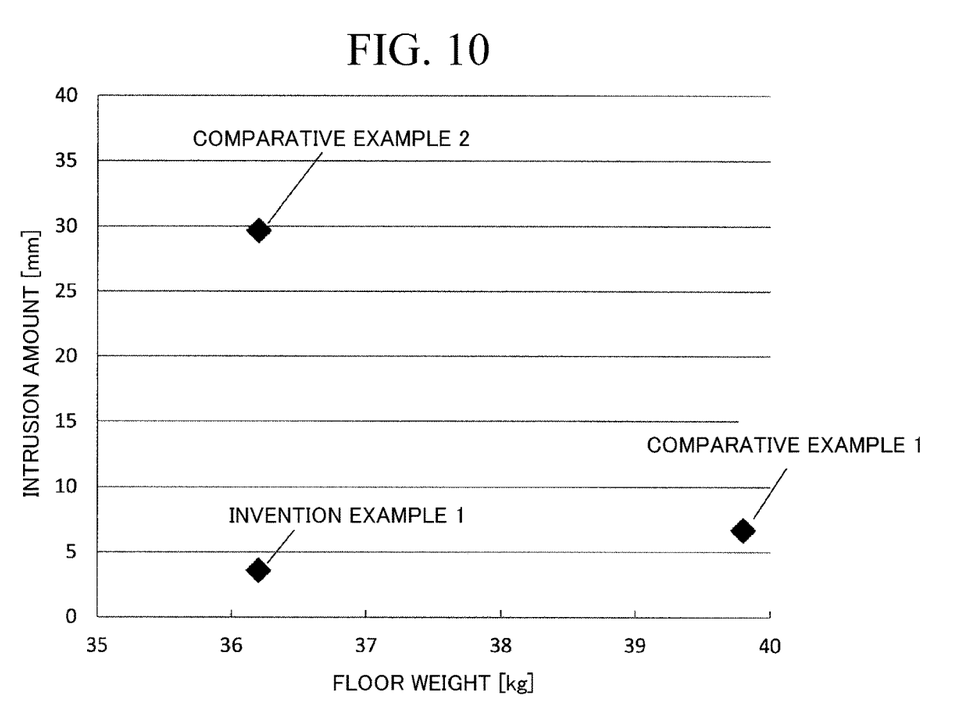
FIG. 10 is a graph showing the results of a collision simulation in Example 1 and showing the relationship between an intrusion amount and a floor weight.

FIG. 10 is a graph showing the relationship between the intrusion amount in the collision simulation and the weight of the floor structure. As shown in FIG. 10, in Invention Example 1, weight reduction is significantly achieved as compared with Comparative Example 1, and the intrusion amount is significantly suppressed as compared with Comparative Example 2 having the same weight.

EXAMPLE 2

Figure 11:
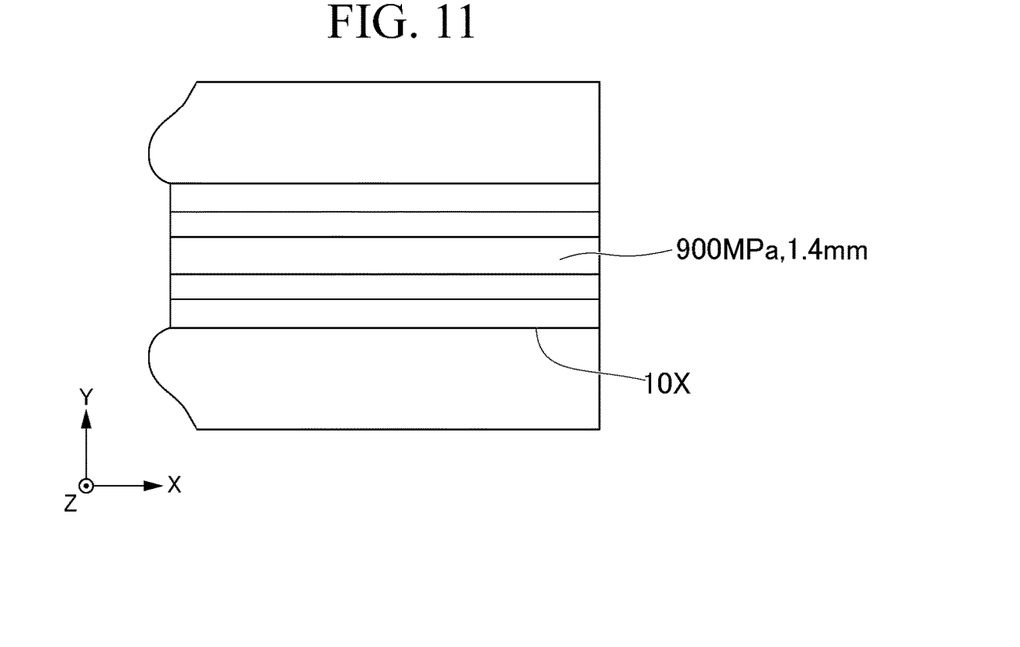
FIG. 11 is a plan view showing a floor tunnel according to Comparative Example 3 of Example 2.
Figure 12:
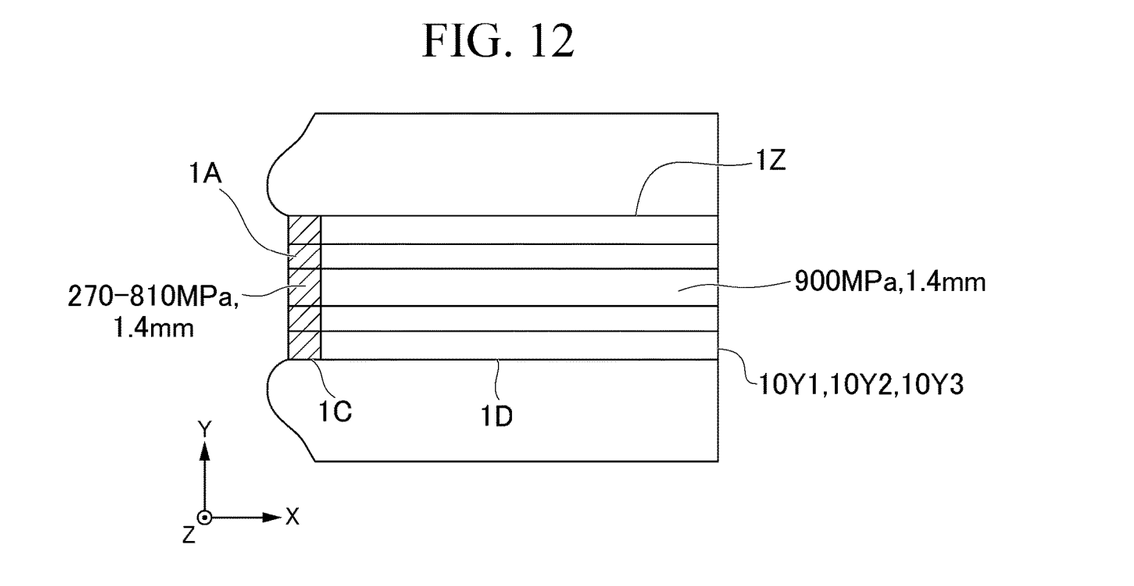
FIG. 12 is a plan view showing a floor tunnel according to Invention Examples 2 to 4 of Example 2.

As in Example 1, analysis models of the vehicle were created, and a collision simulation to simulate a pole front collision test was executed. As the analysis model, as shown in FIG. 11, a model (Comparative Example 3) having a floor tunnel 10X in which a plate thickness is 1.4 mm and yield strength of the entire member is 900 MPa was used. In addition, as shown in FIG. 12, three models in which both the front end region 1C and the main region 1D have a plate thickness of 1.4 mm and the yield strength of the main region 1D is 900 MPa, while the yield strength of the front end region 1C is 810 MPa (Invention Example 2), 540 MPa (Invention Example 3), and 270 MPa (Invention Example 4) were also used.

Here, Invention Example 2 is a model in which the yield strength of the front end region 1C is 10% lower than the yield strength of the main region 1D (that is, when the yield strength of the main region 1D is 100%, the yield strength of the front end region 1C is 90%). Further, Invention Example 3 is a model in which the yield strength of the front end region 1C is 40% lower than the yield strength of the main region 1D (that is, when the yield strength of the main region 1D is 100%, the yield strength of the front end region 1C is 60%). Furthermore, Invention Example 4 is a model in which the yield strength of the front end region 1C is 70% lower than the yield strength of the main region 1D (that is, when the yield strength of the main region 1D is 100%, the yield strength of the front end region 1C is 30%).

The external dimensions and weight of the floor tunnel 10X of Comparative Example 3, the floor tunnel 10Y1 of Invention Example 2, the floor tunnel 10Y2 of Invention Example 3, and the floor tunnel 10Y3 of Invention Example 4 were all the same. Specifically, the total length is 1600 mm, the height is 300 mm, and the width is 480 mm.

In the floor tunnels of Invention Examples 2 to 4, the front end region 1C is a region up to 30 mm starting from the front end 1A.

In this simulation, the collision speed of the vehicle with respect to the pole is 64 km/h. Then, a difference between the distance between two points of the front end and the rear end of each of the floor tunnels 1X, 1Y, and 1Z in an initial state before the collision and the distance between two points of the front end and the rear end of each of the deformed floor tunnels 1X, 1Y, and 1Z after the collision is an "intrusion amount". Then, the collision performance of each analysis model was evaluated based on this intrusion amount.

Figure 13:
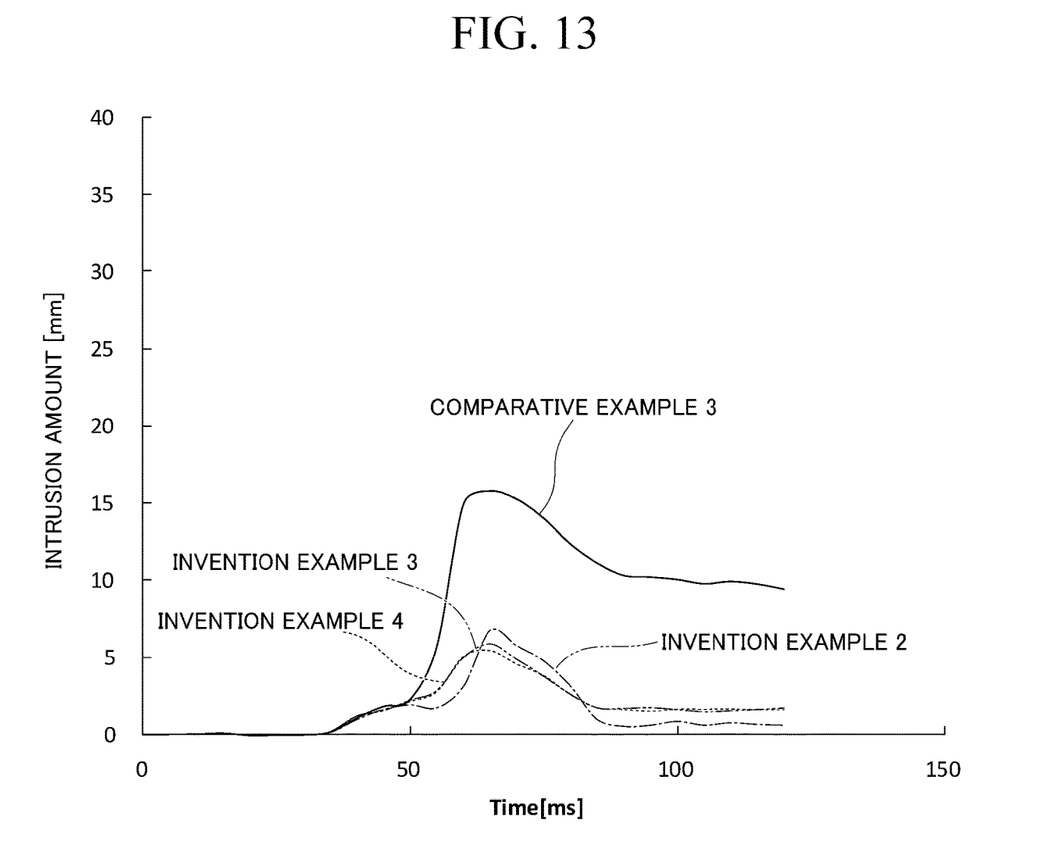
FIG. 13 is a graph showing the results of a collision simulation in Example 2 and showing the time history of an intrusion amount.

FIG. 13 shows the result, and Invention Examples 2 to 4 significantly suppress the intrusion amount as compared with Comparative Example 3. As described above, by setting the yield strength of the front end region 1C to 90% or less of the yield strength of the main region 1D, it is possible to significantly suppress the intrusion amount.

One embodiment and examples of the present invention have been described above, but the present invention is not limited to such examples. It is obvious to those skilled in the art that various modification examples can be conceived, and it is understood that the modification examples also naturally belong to the technical scope of the present invention.

For example, in the above description, a welding joint (for example, spot welding) has been exemplified as a joint between the configuration elements, but a rivet joint or an adhesion joint may be used instead of the welding joint.

Figure 14:
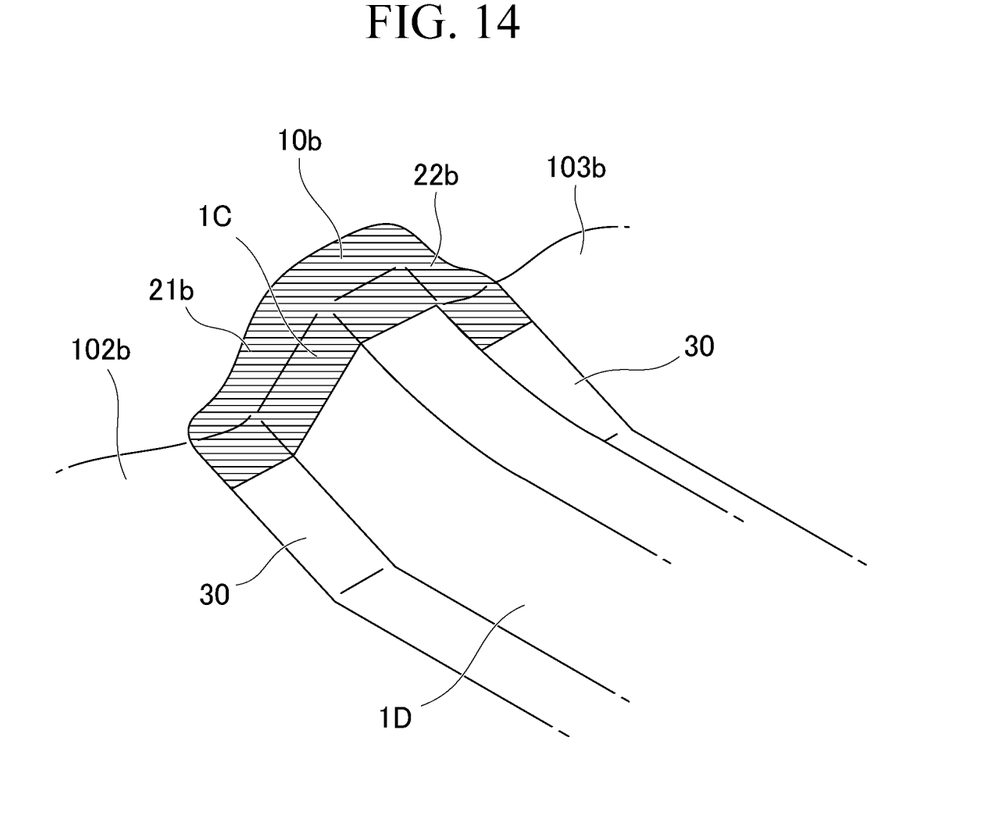
FIG. 14 is a perspective view showing a modified example of a floor tunnel.

Further, in the above embodiment, as shown in FIG. 1, the configuration in which the upper flange 10b, the left wall flange 21b, and the right wall flange 22b are separated from each other has been described. However, the present invention is not limited to this configuration, and as shown in a modification example of FIG. 14, a configuration in which the upper flange 10b, the left wall flange 21b, and the right wall flange 22b continue to each other and integrated may be employed.

Further, the main region 1D may be joined by laser welding or the like.

INDUSTRIAL APPLICABILITY

According to the floor tunnel of the present invention, it is possible to satisfy all of collision performance, soundproofing performance, and weight reduction.

BRIEF DESCRIPTION OF THE REFERENCE SYMBOLS

1 Floor tunnel
1A Front end
1B Rear end
1C Front end region
1D Main region
BO Boundary position
C Curved shape portion
D Linear shape portion

The invention claimed is:

1. A floor tunnel which is laid on a floor surface of a vehicle interior along a vehicle front-rear direction, extends substantially linearly along the vehicle front-rear direction, has a front end and a rear end, and has an open cross-sectional shape of a hat shape in which a shape of a cross section perpendicular to the vehicle front-rear direction protrudes from the floor surface, the floor tunnel comprising:
a front end region that includes the front end; and
a main region that has the rear end and continues to the front end region,
wherein, when a total length from the front end to the rear end is L (mm), L being 1000 mm or more, a boundary position between the front end region and the main region is within a range between a position at 30 mm from the front end toward the rear end and a position at L/5 from the front end toward the rear end,
wherein a yield strength of the front end region is lower than a yield strength of the main region, and
wherein a top wall portion of the front end region is free of a reinforcing member.

2. The floor tunnel according to claim 1, further comprising, when a shape of the floor tunnel along the vehicle front-rear direction is seen in a vertical cross section:
a curved shape portion that includes the front end and is curved upward from the rear end toward the front end; and
a linear shape portion that continues to the curved shape portion, extends substantially linearly along the vehicle front-rear direction, and includes the rear end,
wherein the front end region is in the curved shape portion.

3. The floor tunnel according to claim 2,
wherein both the front end region and the main region are made of steel, and
wherein a Young's modulus of the front end region and a Young's modulus of the main region are the same.

4. The floor tunnel according to claim 3, wherein the yield strength of the front end region is lower than the yield strength of the main region by 10% or more and 80% or less.

5. The floor tunnel according to claim 4, wherein a plate thickness of the front end region is thinner than a plate thickness of the main region.

6. The floor tunnel according to claim 3, wherein a plate thickness of the front end region is thinner than a plate thickness of the main region.

7. The floor tunnel according to claim 3, wherein the yield strength of the main region is 780 MPa or more and 1800 MPa or less.

8. The floor tunnel according to claim 2, wherein the yield strength of the front end region is lower than the yield strength of the main region by 10% or more and 80% or less.

9. The floor tunnel according to claim 8, wherein a plate thickness of the front end region is thinner than a plate thickness of the main region.

10. The floor tunnel according to claim 2, wherein a plate thickness of the front end region is thinner than a plate thickness of the main region.

11. The floor tunnel according to claim 2, wherein the yield strength of the main region is 780 MPa or more and 1800 MPa or less.

12. The floor tunnel according to claim 1,
wherein both the front end region and the main region are made of steel, and
wherein a Young's modulus of the front end region and a Young's modulus of the main region are the same.

13. The floor tunnel according to claim 12, wherein the yield strength of the front end region is lower than the yield strength of the main region by 10% or more and 80% or less.

14. The floor tunnel according to claim 13, wherein a plate thickness of the front end region is thinner than a plate thickness of the main region.

15. The floor tunnel according to claim 12, wherein a plate thickness of the front end region is thinner than a plate thickness of the main region.

16. The floor tunnel according to claim 12, wherein the yield strength of the main region is 780 MPa or more and 1800 MPa or less.

17. The floor tunnel according to claim 1, wherein the yield strength of the front end region is lower than the yield strength of the main region by 10% or more and 80% or less.

18. The floor tunnel according to claim 17, wherein a plate thickness of the front end region is thinner than a plate thickness of the main region.

19. The floor tunnel according to claim 1, wherein a plate thickness of the front end region is thinner than a plate thickness of the main region.

20. The floor tunnel according to claim 1, wherein the yield strength of the main region is 780 MPa or more and 1800 MPa or less.

21. The floor tunnel according to claim 1, wherein the floor tunnel having the open cross-sectional shape of the hat shape is configured to bend upon receiving an impact force.

* * * * *